Patented Apr. 22, 1941

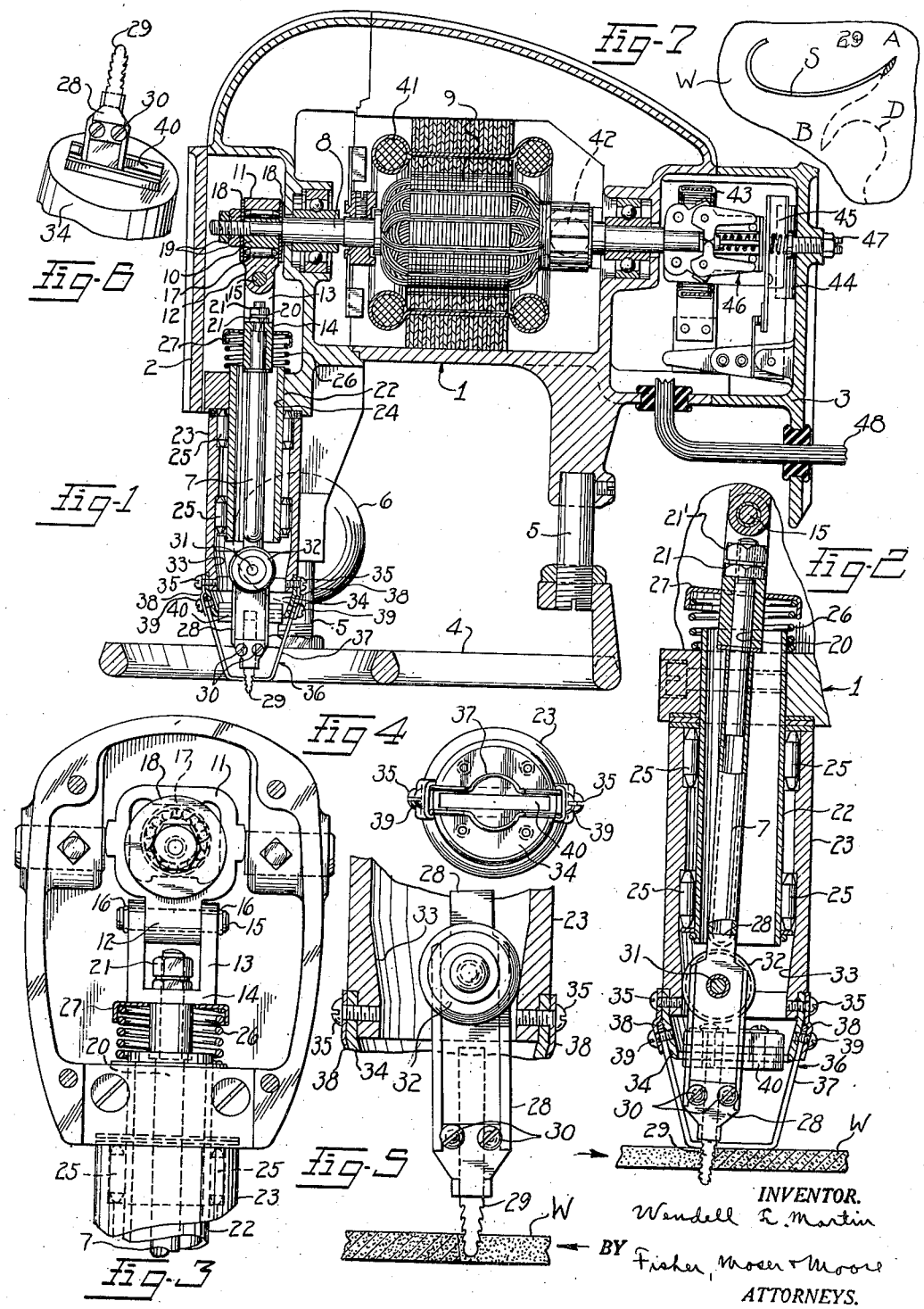

2,239,291

UNITED STATES PATENT OFFICE 2,239,291

SCROLL CUTTING MACHINE

Wendell L. Martin, Cleveland, Ohio, assignor, by mesne assignments, to International Register Company, Chicago, Ill., a corporation of Illinois Application December 5, 1938, Serial No. 244,121

8 Claims. (Cl. 30—273)

My invention relates to scrollwork cutting machines for cutting sheet material of various sorts such as cloth, composition boards and other materials in sheet form, and more particularly to machines adapted to rest upon and move over the work, and having a rapidly reciprocating blade adapted to project below the face of the machine into and remain in the material being cut during cutting operations.

Heretofore scrollwork or portable cutters designed to move over the work and employing a blade having a cutting edge along one side, which blade remains in the work during the entire stroke, have been used for many years. In cutters of this type it is desirable to provide a convenient method to allow the cutting blade to follow a line on the material such as a block letter or other design which is to be cut out. One method formerly used was to offset the tool from a pivotal axis and mount the presser foot so its position was maintained by the track left by the blade to hold the cutting tool relatively opposite to the direction in which the entire machine was being moved. However, such prior cutters required a great many parts and lacked certain advantages of construction found in the present machine.

The general object of the present invention is to provide a cutter which is quiet and efficient in operation and of simple and economical construction.

A further object is to provide a scrollwork cutter in which the direction of movement of the cutter blade can be reversed without the necessity of removing the blade from or repositioning or turning the blade in the work, and in which the tool immediately adjusts itself to follow the trail accurately.

A further object of the invention is to mount the cutter bar in such manner that the cutter bar and cutter blade may assume a slight angle to the vertical when the machine is in operation.

A still further object of the invention is the provision of means for slightly rocking the cutter bar and cutting blade slightly radially toward a center or vertical position, on the down stroke and in a reverse direction on the up stroke, whereby the blade cuts with a slicing action on the working stroke thus turning down the edge of the material in which the blade is being advanced and on its upstroke will be rocked a corresponding degree in a reverse direction, thus clearing the smooth finished edge at the extremity of the cut.

A still further object is the provision of an improved tubular mounting for the cutter bar which can be conveniently rotated by hand thus locating the blade and at the same time providing a compact assembly which permits unobstructed view of the work.

Other objects and advantages of the invention will be apparent as the specification is considered with the accompanying drawing, in which:

Figure 1 is a side view partly in section of the entire machine with the cutter blade in central or idle position;

Figure 2 is an enlarged detail sectional side view of the cutter bar and tubular mounting therefor showing the cutter bar in the lowered inclined working position assumed when cutting in the direction of the arrow;

Figure 3 is a front elevation of the machine, partly broken away and partly in section and with the front plate removed;

Figure 4 is a bottom plan view of the blade holder with cutter blade removed;

Figure 5 is a detailed elevation partly in section and partly broken away showing the blade in the elevated inclined position assumed when cutting in the direction of the arrow;

Figure 6 is a detail fragmentary perspective view of the blade holder showing the blade in working position; and Figure 7 is a diagrammatic view illustrating the action of the blade when its path of movement is substantially reversed.

Referring more particularly to the drawing 1 denotes a sectional supporting frame or casing, preferably of cast construction, for supporting and housing the cutter mechanism and motor therefor. This casing has a front plate 2 and a rear plate 3 and is suitably connected to a supporting base or runner 4, by means of posts 5, preferably three in number, but only two of which are shown. The base 4, which is of spider like formation, to increase visibility and to reduce frictional contact to the minimum, supports the casing on the surface of the work being cut and is designed to slide freely thereover in any direction. A knob 6 of spherical form projects laterally from the casing at each side thereof adjacent the forward end of the machine, where they may be conveniently grasped by the operator. These knobs, only one of which is shown, provide hand grips for moving the machine over the material being cut.

The cutter mechanism comprises a double edged cutter blade carried by a vertically reciprocating cutter bar or shaft 7 depending from and actuated by the forward end of an armature shaft 8, of an electric motor 9, suitably mounted in the casing. Thus, the reduced forward end of armature shaft 8 has fixed thereto an eccentric 10 which is encompassed by an eccentric ring 11. The ring 11 is formed with an integral depending apertured lug 12 which is pivotally connected to the upwardly extending arms 13 of a substantially U-shaped yoke 14, by means of a short pin 15 extending through the aperture in the lug and through registering openings in the arms 13. Suitable fastening means, such as split retaining rings 16 hold the pin in place. Needle bearings 17 for the eccentric 10 and ring 11 are confined between thrust washers 18 by means of nuts 19 threaded on the outer reduced threaded end of armature shaft 8. The upper reduced end of cutter bar or shaft 7 extends through a tubular extension or bearing 20, integrally formed on the yoke 14, and is supported for turning movement therein by means of a nut 21 and lock nut 21'.

The cutter bar 7 extends axially through inner and outer members 22 and 23 respectively, the inner member having a press fit at its upper end in the walls of an opening 24 formed in the casing 2 and the outer member being rotatably supported by the inner member. The inner tubular member 22 constitutes an inner race for needle bearings 25 and the outer tubular member 23 provides convenient means for the manual manipulation of the cutter blade, during cutting operations, as will be presently understood. A coil expansion spring 26 bearing at its upper end against a flanged washer 27 encircles with its lower convolutions the projecting upper end of the inner race 22 and serves to maintain the cutter shaft in axial alinement with the ball race assembly just described, until the blade is forced to an inclined position against the work during cutting operations. This spring also has a tendency to hold the cutter in its upper position and acts as a dampener, keeping the thrust in one direction.

A sheet metal blade holder 28 has an elongated upwardly extending portion which sleeves over and is welded or otherwise suitably fastened to the lower end of the cutter shaft or bar 7. Secured to the enlarged or flattened lower end of the blade holder 28, is a double edged cutter blade 29, suitable fastening means such as screws 30 being employed to removably secure the blade to the holder. Extending transversely through the holder is a pin or shaft 31 which rotatably supports a pair of rollers 32, only one of which is shown, adapted to ride over downwardly and inwardly inclined cam faces 33 formed on the lower inner periphery of outer tubular member 23, when the cutter bar and blade holder are reciprocated during cutting operations. The blade 29 is preferably substantially oval in cross section and tapers slightly in thickness and width from its upper to its lower end.

The blade holder extends through and is guided during its reciprocatory and swinging movements by a guide cup 34, centrally slotted as at 40 for this purpose, and secured to the outer face of the tubular member 23, at the lower end thereof by bolts 35. A stripper foot 36 comprising two substantially U-shaped wires 37 is clamped between the guide cup and a pair of brackets 38, by means of bolts 39 and bolts 35 previously mentioned herein. The flat blade holder has a tight but sliding fit in the slot 40 of guide cup 34 and by virtue of the pivotal mounting of the cutter rod 7 on the armature shaft 8, the holder is capable of oscillatory movement in the slot. As it is believed that the construction of the blade holder and guide cup will be understood from the foregoing further detailed description is deemed unnecessary.

The motor 9 comprises the usual field coils 41, armature 42, resistor 43, condenser 44, contact assembly 45, and speed control governor assembly 46. When adjusted by screw 47, the governor automatically holds the motor speed to the desired predetermined value, the principle being the use of the well known fly-ball governor to divert the power to the motor through the resistor 43 when the motor passes a predetermined speed. This reduces the voltage applied to the motor and therefore the motor speed. As the motor speed is reduced, the fly-ball governor allows the governor contacts to close thus shorting out the resistor and impressing the full voltage on the motor which again causes it to increase in speed. By virtue of this governing device, the mounting of the cutter shaft directly on the motor shaft through an eccentric is made possible and the necessity for using gearing or belts and pulleys is eliminated. At the same time a very wide adjustment of speed is provided for. A lead line 48 from a source of electricity provides the necessary current for running the motor.

In practice the operator grasps the knobs 6 and moves the machine over the board or other work W until the blade 29 is above the design D to be cut. The motor is then started and the blade is caused to reciprocate very rapidly due to the eccentric mounting of the cutter shaft 7. At the same time the blade moves in an oscillatory manner toward and away from the vertical while the machine is being pushed or pulled in the desired direction, in a manner presently described. The resistance to the forward movement of the blade offered by the uncut material at the end of slot S of design D, see Figure 7, maintains the cutter shaft and its blade in inclined position at all times during cutter operations. However, when the nature of the design necessitates a reversal of blade movement, or substantially so, as in cutting from point A to point B, in Figure 7, wherein the blade 29 is illustrated in the position assumed as the reverse movement of the machine is started, some lost motion will occur until the resistance offered by the uncut material to the opposite side of the blade to that which was used in cutting the slot S, causes the blade to swing to and through the vertical to another and oppositely disposed inclined working position. This can be done without removing the blade from the work.

Slight oscillatory or radial movement toward a center or vertical position and back to inclined working position is imparted to the blade by means of the rollers 32 which ride over the inclined face 33 previously referred to. During the downward or cutting stroke of the blade 29 the inclined face 33 forces the blade forwardly or in the direction of the arrow, Figure 2, against the material being cut, and during the upward or idle stroke this inclined face moves the blade in an opposing direction or back into the slot previously cut. It will thus be seen that the inclined blade cuts with a slicing action on its working stroke thus turning down the top edge of the material in which the blade is being advanced and that on its upstroke the blade will be rocked in a reverse direction, thus clearing and leaving undisturbed the smooth finished edge thus formed at the forward extremity of the cut.

Having thus described my invention, what I claim is:

1. A cutting machine having a base adapted to slide over the material being cut, a swiveling tool holder and tool therein extending at an angle to said base and the material being cut, a tubular mounting for said tool holder partially enclosing the holder and adapted for manually turning the tool on a longitudinal axis common to both said tubular mounting and tool holder, power means for reciprocating the tool holder in said mounting and means for varying the angularity of the tool holder and tool during the reciprocation of said holder and tool.

2. A cutting machine having a base adapted to slide over the material being cut, a swiveling tool holder and tool therein extending at an angle to said base and the material being cut, a tubular mounting for said tool holder partially enclosing the holder and adapted for manually turning the tool on a longitudinal axis common to both said tubular mounting and tool holder, power means for reciprocating the tool holder in said mounting, and means on the interior of said tubular mounting engageable by said tool holder for automatically varying the angularity of the tool holder and tool during the reciprocation of said holder and tool.

3. In a cutting machine, a base adapted to slide over material being cut, a frame mounted on said base, a cutter bar pivotally mounted in said frame above and substantially at right angles with respect to said base, a tool holder on said bar and a double edged blade in said holder, said cutter bar and cutter being movable about said pivot to an inclined position by the pressure of the material being cut, a motor for reciprocating said holder and blade, means for turning said cutter bar and blade on a longitudinal axis common to said bar and blade, a cam surface on said means, and a member carried by said tool holder engageable with said cam surface for moving said cutter bar on its pivot from said inclined position toward a vertical position during the reciprocating of said bar.

4. A cutting machine having a base adapted to slide over the material being cut, a swiveling tool holder and tool therein extending at an angle to said base and the material being cut, a tubular mounting for said tool holder partially enclosing the holder and adapted for manually turning the tool on a longitudinal axis common to both said tubular mounting and tool holder, power means for reciprocating the tool holder in said mounting and means on said tubular mounting engageable by means on said tool holder for varying the angularity of the tool holder and tool during the reciprocation of said holder and tool.

5. In a cutting machine of the character described, a base adapted to slide on the material being cut, a reciprocating tool holder, and yielding means normally holding said tool holder in substantially vertical position, said tool holder being movable rearwardly of said base in opposition to said yielding means into a downwardly and rearwardly inclined position by pressure of a tool carried by said holder against the material during the cutting operation and forward movement of said base on the material.

6. In a cutting machine of the character described, a base adapted to slide on the material being cut, a reciprocating member, a tool holder carried by said member, and means normally supporting said member in substantially vertical position and for swinging movement toward and away from vertical position, said means comprising yielding means normally holding said reciprocating member in substantially vertical position, said member being movable rearwardly of said base in opposition to said yielding means into a downwardly and rearwardly inclined position by pressure of a tool carried by said holder against the material during the cutting operation and forward movement of said base on the material.

7. In a cutting machine of the character described, a base adapted to slide on the material being cut, a reciprocating member, a tool holder carried by said member, and means normally supporting said member in substantially vertical position for turning movement about a vertical axis and swinging movement about a substantially horizontal axis toward and away from vertical position, said means comprising yielding means normally holding said reciprocating member in substantially vertical position, said member being movable rearwardly of said base in opposition to said yielding means into a downwardly and rearwardly inclined position by pressure of a tool carried by said holder against the material during the cutting operation and forward movement of said base on the material.

8. In a cutting machine of the character described, a base adapted to slide on the material being cut, a reciprocating member, a tool holder carried by said member, and means normally supporting said member in substantially vertical position for turning movement about a vertical axis and swinging movement about a substantially horizontal axis toward and away from vertical position, said means comprising yielding means normally holding said reciprocating member in substantially vertical position, said member being movable oppositely to the direction of movement of said base on the material and in opposition to said yielding means into a downwardly inclined position by pressure of a tool carried by said holder against the material during the cutting operation and movement of said base on the material.

WENDELL L. MARTIN.